(12) United States Patent
Tsukihashi

(10) Patent No.: US 6,958,961 B2
(45) Date of Patent: *Oct. 25, 2005

(54) DATA PROCESSING CIRCUIT FOR TEMPORARILY SUSPENDING DATA RECORDING ONTO A DISK

(75) Inventor: Akira Tsukihashi, Gunma (JP)

(73) Assignee: Sanyo Electric Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 576 days.

(21) Appl. No.: 09/476,862

(22) Filed: Jan. 3, 2000

(65) Prior Publication Data

US 2002/0145959 A1    Oct. 10, 2002

(30) Foreign Application Priority Data

Jan. 6, 1999   (JP) ................................. 11-000917

(51) Int. Cl.⁷ .............................................. G11B 7/00
(52) U.S. Cl. ............................... 369/47.33; 369/47.42; 369/47.48
(58) Field of Search .......................... 369/47.33, 47.42, 369/47.48, 53.18

(56) References Cited

U.S. PATENT DOCUMENTS

| | | | | |
|---|---|---|---|---|
| 5,307,473 A | * | 4/1994 | Tsuboi et al. | 711/143 |
| 5,354,975 A | * | 10/1994 | Ishibashi et al. | 235/380 |
| 5,434,997 A | * | 7/1995 | Landry et al. | 714/12 |
| 5,436,875 A | | 7/1995 | Shinada | |
| 5,958,067 A | * | 9/1999 | Kaneda et al. | 714/6 |

FOREIGN PATENT DOCUMENTS

| | | |
|---|---|---|
| EP | 0-429-139 | 5/1991 |
| EP | 0-463-183 | 1/1992 |

* cited by examiner

*Primary Examiner*—Gautam R. Patel
(74) *Attorney, Agent, or Firm*—Hogan & Hartson, LLP

(57) ABSTRACT

To resume data writing onto a disk, a recording start position detection means (19) detects a recording start position, and a synchronous setting means (20) synchronizes recording data with recorded data on a disk so that recording data successive to the recorded data on the disk can be additionally written onto the disk without a break. Data writing onto a disk is suspended until an amount of data equivalent to data writing capacity has been stored in the buffer memory (13). Data writing is resumed upon detection of the fact that an amount of data equivalent to data writing capacity has been stored in the buffer memory (13). With the above, power consumption can be reduced during a period when recording capability of a disk recording device exceeds the data transfer speed.

8 Claims, 2 Drawing Sheets

DATA PROCESSING CIRCUIT FOR TEMPORARILY SUSPENDING DATA RECORDING ONTO A DISK

BACKGROUND OF THE INVENTION

1. Field of the Invention

The present invention relates to a disk recording device capable of additional data writing while preserving data continuity, and in particular to a disk recording device capable of power saving when recording data onto the disk, the data being supplied at a slower transfer speed than a data writing speed.

2. Description of the Related Art

A CD-R (compact disk recordable) drive, a type of CD drive, is known as a disk recording device for recording data on a CD-R disk. To record audio data to a CD-R disk, using as source audio data recorded in a CD-DA (CD-Digital Audio), using a CD-R drive, it is necessary to apply a disk-at-once method in view of compatibility with a CD-DA player.

Meanwhile, to record data using data stored in a CD-ROM as source, using a CD-R drive, it is necessary to apply a disk-at-once method, track-at-once method, or session-at-once method in view of compatibility with a CD-ROM drive as the CD-ROM drive can not always read data written by a packet write method.

Write-once media, such as a CD-R, which are incapable of physical erasure of once recorded data, have a problem such that, should recording data be discontinued, medium regions (e.g., a track) used in the recording can not be used again.

In order to address such a problem, a disk recording method capable of additional data writing and prevention of wasting a medium region used in the recording when the data recording is discontinued, has been desired.

Specifically, what is desired is that, when data immediately following the discontinued data can be written, without a break, onto a disk at a region where the data recording was discontinued, and thereafter, additional data writing can be achieved without wasting the medium regions that were used in the discontinued recording.

Here, to record data onto a disk using a disk recording device, a disk reproducing device on a sender side sends audio or video data at a standard defined rate to the disk, and the sent data is received by a disk recording device and used in data writing onto a disk. In such data writing, it is often a case that a data processing rate at which the disk recording device writes data onto a disk is faster than a data transfer rata at which the sender sends recording data.

In such a case, data writing is performed intermittently, which may cause a wasted power problem as power is consumed during intervals while data recording is not carried out.

SUMMARY OF THE INVENTION

According to the present invention, when data recording capability of a disk recording device is superior with a faster data recording speed than a data transfer speed, data recording onto a disk is suspended until an amount of data equivalent to the data writing capacity has been stored in a buffer memory. With this arrangement, data recording onto a disk is suspended during a period when the data recording capacity of the disk recording device exceeds a data transfer speed, achieving a reduction of power consumption.

Also, beside power consumption reduction achieved by suspending data writing onto a disk while data recording capacity exceeds a data transfer speed, data to follow the recorded data on the disk can be additionally written onto the disk without a break in the data.

When a data sender can control data transmission in accordance with the state of data writing onto a disk, by setting a full data writing capacity of a buffer memory at a full memory capacity thereof, a period of suspended data recording onto a disk can be set so as to make best use of the memory capacity of the buffer memory, in addition to achievement of power consumption reduction.

Meanwhile, when the data sender cannot control data transmission in accordance with the state of data writing onto a disk and data transmission is performed independently, by setting a full data writing capacity of a buffer memory at the full memory capacity thereof deducted by a data amount expected to be written into the buffer memory while the buffer memory is preparing to resume data writing onto the disk, overflow of the buffer memory can be prevented.

Also, as the disk rotation speed immediately before the suspension of data writing onto the disk is maintained during a period when data recording is suspended, a period of time needed, after resuming data recording, for the disk to achieve a rotation speed suitable for data recording onto the disk can be reduced. Therefore, the suspended data recording period can accordingly be prolonged, achieving further reduction of power consumption.

BRIEF DESCRIPTION OF THE DRAWINGS

The above and other objects, features, and advantages of the present invention will become further apparent from the following description of the preferred embodiment taken in conjunction with the accompanying drawings wherein.

DESCRIPTION OF THE PREFERRED EMBODIMENTS

Figure 1:
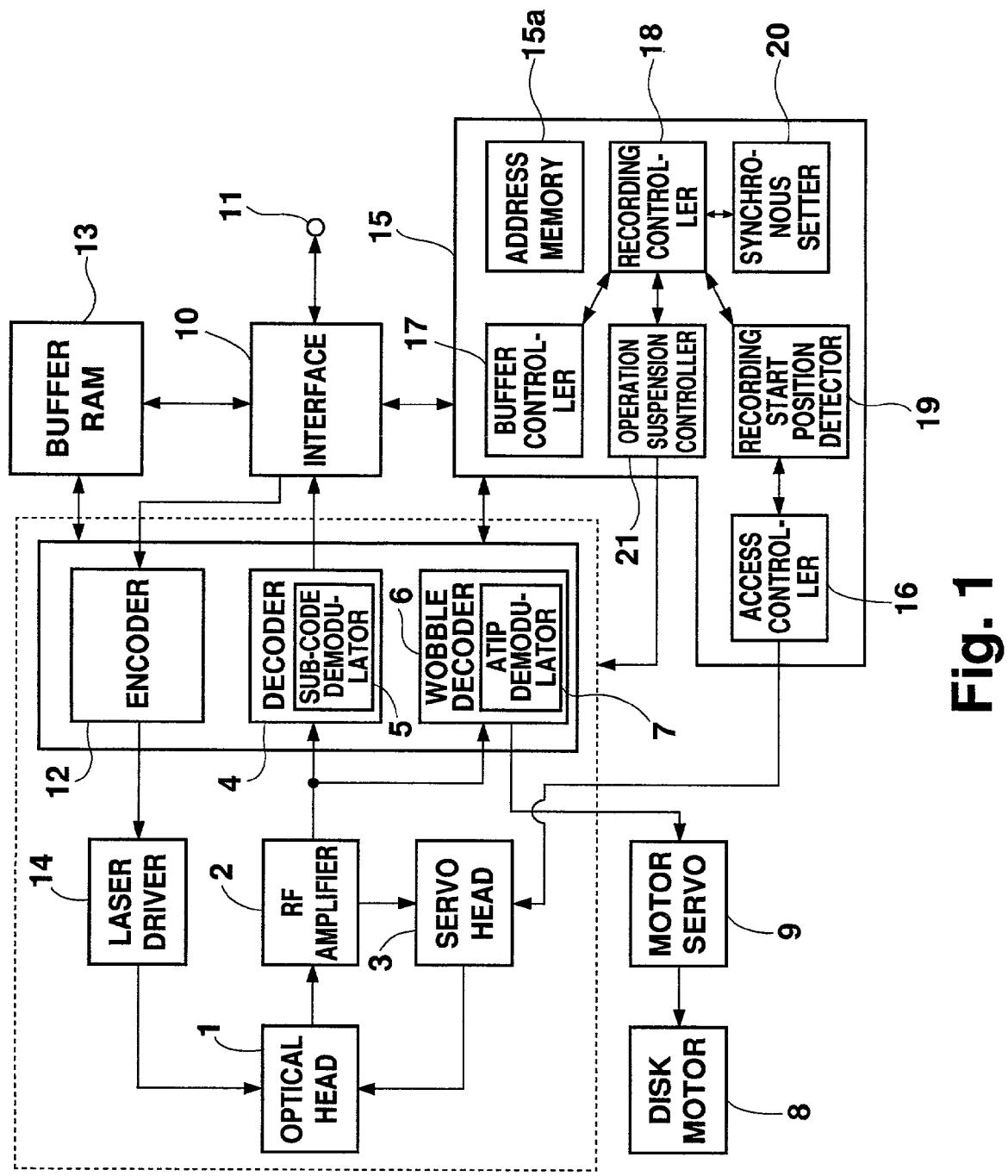
FIG. 1 is a block diagram showing a circuit structure of a preferred embodiment of a disk recording device of the present invention in the form of a CD-R drive.
Figure 2:
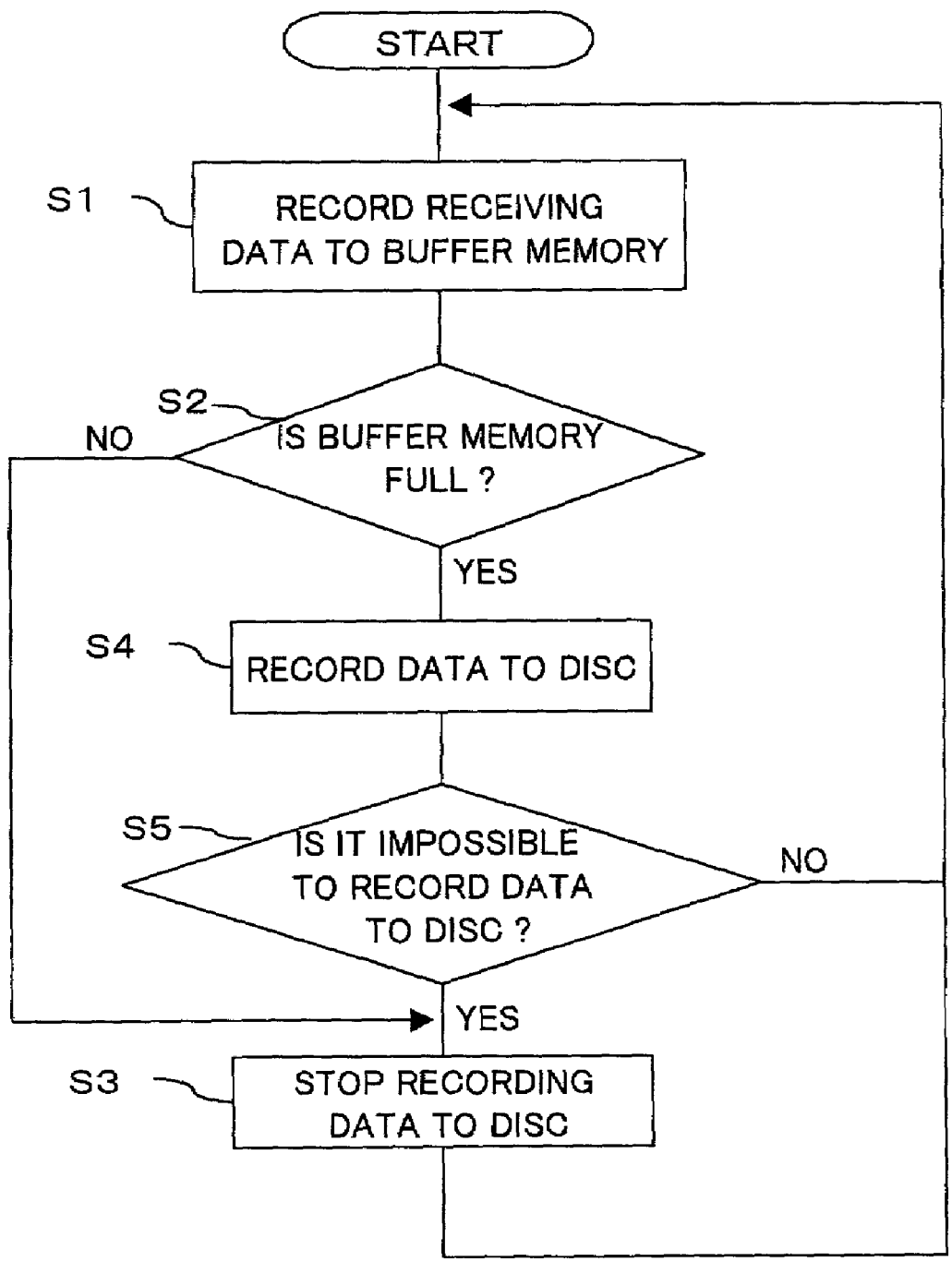
FIG. 2 is a flowchart for operation in the preferred embodiment.

FIG. 1 is a block diagram showing a circuit of a preferred embodiment of a disk recording device according to the present invention in the form of a CD-R drive.

The drawing shows an optical head 1 for irradiating a laser beam for tracing a disk to perform writing or reading of recording data with respect to a disk, an RF amplifier 2 for amplifying an RF signal (a high frequency signal) obtained by reading recorded data from the disk by the optical head 1, and for binarizing the RF signal into digital data to output, and a head servo circuit 3 for feed-backing an output from the optical head 1 received via the RF amplifier 2 to achieve focusing control, tracking control, and thread feeding control. Through the focusing control, the laser beam is focused on a signal plane of the disk. Through the tracking control, the laser beam tracks the signal track of the disk. Through the thread feeding control, the optical head 1 is moved in the radial direction of the disk.

A decoder 4 is responsible for signal processing to demodulate digital data output from the RF amplifier 2. A sub-code demodulation circuit 5 demodulates a sub-code separated from the data.

Specifically, the decoder 4 demodulates the data read from the disk in synchronism with a bit clock reproduced from the read data. The demodulation is achieved free from the influence of variation of a disk rotation speed.

A wobble decoder 6 extracts 22.05 kHz wobble components from a pre-groove signal obtained via the RF amplifier 2 to generate components necessary for disk rotation control. The wobble decoder 6 includes an ATIP demodulation circuit 7 for demodulating wobble components to restore an ATIP (absolute time in pre-groove).

A disk motor 8 drives a disk for rotation. A motor servo circuit 9 performs driving control for the disk motor 8.

It should be noted that the motor servo 9 is capable of rotation control of a disk with signals recorded using a constant linear velocity method, as well as rotation control of a disk using a constant angular velocity method when reproducing data from the disk.

An interface 10 is connected, via a connection terminal 11, with the outside for controlling data transmission with an external device. An encoder 12 modulates data received via the interface 10 into recording data to be recorded onto a disk. A buffer RAM 13 is used for caching data from an external device connected to the connection terminal 11 and used as a memory when the cached data is modulated in the encoder 12 into recording data to be recorded onto a disk. Furthermore, the buffer RAM 13 is used for caching data read from the disk, and used as a memory when the data is demodulated in the decoder 4.

The encoder 12 has a CD-ROM modulator for modulation based on CD-ROM standard, and a CD modulator for modulation based on CD-DA standard. The CD-ROM modulator imparts synchronization (sync), header, EDC (error detection code), and ECC (error correction code) to receiving data, EDC being an error detection code for CD-ROM data, and ECC being an error correction code for CD-ROM data. The CD modulator performs CIRC (cross interleaved reed-solomon code) processing and imparts a sub-code to data output from the CD-ROM modulator, CIRC being an error correction code in a CD method. The CD modulator also performs EFM (eight to fourteen modulation) and imparts a synchronous signal.

A laser driver circuit 14 drives a laser source of the optical head 1 to record data onto a disk based on recording data in the form of EFM data output from the encoder 12.

A system control circuit 15 is responsible for system control in connection with data recording onto and reproduction from a disk. The system control circuit 15 comprises an access control means 16, a buffer control means 17, a recording control means 18, a recording start position detection means 19, a synchronism setting means 20, and an operation suspension control means 21. The access control means 16 controls accesses with selective reference to a sub-code address shown in absolute time information contained in a sub-code (sub-Q-code), which was demodulated in the sub-code demodulation circuit 5, and an ATIP address shown in absolute time information contained in an ATIP, which was demodulated in the ATIP demodulation circuit 7. The buffer control means controls data writing and reading with respect to the buffer RAM 13. The reading control means 18 controls data reading from or recording onto a disk depending on the amount of data having been stored in the butter RAM 13 through control by the buffer control means 17. The recording start position detection means 19 detects the beginning of a region with no recorded data on the disk to thereby detect a recording start position, at which the recording control means 18 starts data recording. The synchronism setting means 20 synchronizes recording data to be newly recorded on a disk with recorded data onto the disk, using a synchronous signal of a sub-code extracted by the decoder 4 and sub-Q-data demodulated by the sub-code demodulation circuit 5. The operation suspension control means 21 controls operation suspension by halting power supply to a predetermined circuit depending on the amount of data stored in the buffer RAM 13 through control by the buffer control circuit 17.

Specifically, the operation suspension control circuit 21 controls operation suspension of the circuits shown enclosed by the broken line in FIG. 1, namely reproduction circuits for processes from data reading from a disk to data demodulation, and recording circuits for processes from modulation of received data into recording data to be recorded onto a disk to data writing onto a disk, by halting power supply to these circuits.

The thus constructed disk recording device executes a recording operation upon receipt, via the interface 10, of data to be recorded onto a disk.

Once data recording operation is started, a reference clock with crystal oscillation accuracy is then used as a system clock for recording circuits.

The optical head 1 is controlled so as to read a pre-groove signal from a disk, using a laser output for disk reproduction. The pre-groove signal read by the optical head 1 is supplied to the RF amplifier 2 for waveform shaping before wobble components are extracted therefrom in the wobble decoder 6. The extracted wobble components are demodulated into an ATIP in the ATIP demodulation circuit 7.

When data to record is supplied from an external device connected to the connection terminal 11, the data is received by the interface 10 and then written into the buffer RAM 13. The data written in the buffer RAM 13 is modulated in the encoder 12 into recording data in a suitable form for recording onto a disk.

When the laser beam of the optical head 1 traces the disk, and reaches a point to start data writing, the encoder 12 sequentially outputs recording data using the EFM frame unit, while address data indicative of an address corresponding to the output recording data is sequentially updated and stored in the address memory 15a in the system control circuit 15.

The laser driving circuit 14 drives the laser source of the optical head 1, based on the recording data output from the encoder 12, so that recording data is recorded onto the disk.

Should buffer under-run occur or recording onto a disk become impossible due to any impact given, the recording control means 18 determines discontinuation of data recording onto the disk. Accordingly, the encoder 12 discontinues output of recording data and the optical head 1 stops irradiation of the writing beam to thereby discontinue data writing onto the disk. Here, when the encoder 12 stops output of recording data, address data corresponding to the address of the last frame of the recording data output from the encoder 12 immediately before the discontinuation is stored in the address memory 15a in the system control circuit 15. The stored address data includes time information concerning sub-code Q-channel data (sub-Q-data), and address information indicating that a particular frame is the $n^{th}$ one of the EFM frames in the time information. The synchronism setting means 20 knows, based on the address data stored in the address memory 15a, what exact time (hours and minutes) the time information in the sub-Q-data for the last frame of the recording data recorded immediately before the discontinuation indicates as an address of that frame, and that the last frame is the $n^{th}$ one of the EFM frames in the time information.

When the next recording data is received via the interface 10, the access control means 16 attempts to access the recording data which has been recorded on the disk by the time of discontinuation of data recording, based on an ATIP restored in the ATIP demodulation circuit 7, and the optical head 1 then begins tracing.

When tracing is started, a pit signal, having been recorded on a disk, is read from the disk, and the RF amplifier 2 obtains EFM data, based on the pit signal.

Then, a system clock is switched to a reproduction clock, which is in synchronism with EFM data, so that demodulation by the decoder 4 and modulation by the encoder 12 are both carried out in synchronism with a reproduction clock.

When further recording data is received via the interface 10, the encoder 12 resumes modulation to resume preparation of recording data.

Meanwhile, when the disk is traced and EFM data is supplied to the decoder 4, the decoder 4 extracts a synchronous signal of a sub-code, and the sub-code demodulation circuit 5 demodulates sub-Q-data. Then, using the synchronous signal and the sub-Q-data, the synchronism setting means 20 synchronizes recording data output from the encoder 12 with data recorded on the disk.

During a period until the synchronism is established, the encoder 12 remains in a waiting state, outputting recording data in a frame immediately following the last recorded frame on the disk immediately before discontinuation of the data recording by the recording control means 18.

Here, the encoder 12 comprises an internal RAM for use in modulation. The internal RAM stores data necessary for CIRC processing when data recording is discontinued, in order to ensure sufficient CIFC inter-leave length (108 EFM frames at the longest) necessary for newly supplied data.

With the encoder 12 in a waiting state, the recording start position detection means 19 detects the beginning of a region with no recorded data on the disk, immediately following the region with recorded data, referring to the address data stored in the address memory 15a.

Specifically, the detection of the beginning of a region with no recorded data on the disk is carried out based on the time information in sub-Q-data and information indicating that particular frame is the $n^{th}$ one of the EFM frames in the time information. That is, detection by the unit of a sub-code frame (a collection of 98 units of EFM frames) is made based on sub-Q-data, and further detection by the unit of an EFM frame is made by counting channel bits, using a synchronous signal as a reference. With the above detection, the end of the last frame of the recorded data on the disk is determined.

When the beginning of a region with no recorded data on the disk is detected, a system clock is gradually switched from a reproduction clock to a reference clock. In addition, the recording control means 18 controls such that the encoder 12 outputs recording data, to resume data recording.

By the time of resuming data recording, the synchronism setting means 20 has established synchronism between data recorded on the disk and recording data output from the encoder 12. Also, the encoder 12 outputs recording data in a frame immediately following the last recorded frame on the disk immediately before the discontinuation of data recording.

With the above, new recording data is recorded in a region successive, without a break, to the region where the last recording date were recorded on the disk immediately before the discontinuation of data recording.

As described above, additional data writing can be achieved using a disk-at-once method.

Next described is a case where a data processing speed at which a disk recording device writes data onto a disk is faster than a data transfer speed at which the sender sends data.

It is assumed that the disk recording device shown in FIG. 1 has a high speed writing capability, such as eight times as fast as the normal speed defined as CD standard, and that data to be received by the interface 10 via the connection terminal 11 is continuous data, such as audio data, video data, or the like, and transferred at a normal speed defined as CD standard.

When the recording capability of a disk recording device is superior with a faster data recording speed than the data transfer speed by a sender, the recording control means 18 sets either a recording suspended state, in which data recording onto a disk is suspended, or a recording state, in which data recording onto a disk is applied, depending on the amount of data stored in the buffer RAM 13. With this arrangement, data recording onto a disk is suspended while the recording capability of the disk recording device exceeds a data transferring speed.

Operation will be described with reference to the accompanying drawings.

Data, supplied via the connection terminal 11 and received by the interface 10, is written into the buffer RAM 13 (S1).

Then, it is judged whether or not data has been stored in the buffer RAM 13 to the amount equivalent to a predetermined full data writing capacity (S2). When it has not yet been stored to this amount, the recording control means 18 sets a recording suspended state to suspend data writing onto a disk, and the buffer control means 17 accordingly suspends data reading from the buffer RAM 13 (S3). The operation process returns to S2 to perform only data writing into the buffer RAM 13.

Here, when a personal computer or the like is connected as an external device to the connection terminal 11, in other words, when the sender can control data transmission according to the state of data writing by the disk recording device, the full data writing capacity of the buffer RAM 13 corresponds to the full memory capacity of the buffer RAM 13 as overflow of the buffer RAM 13 can be prevented by halting data transmission from the sender.

Meanwhile, when a CD player or the like is connected as an external device to the connection terminal 11, in other words, when the sender sends recording data rather one-sidedly irrespective of the state of data writing by the disk recording device, providing that data be written into the buffer RAM 13 to the full memory capacity thereof, more data must be written into the buffer RAM 13, which is then being used for recording start position detection or other processes to prepare for resuming of data writing onto a disk, before data is read from the buffer RAM 13. This may cause the buffer RAM 13 to overflow. Therefore, the full data writing capacity of the buffer RAM 13 in this case means the full memory capacity of the buffer RAM 13 deducted by an amount of data expected to be written into the buffer RAM 13 while the buffer RAM 13 is preparing for resuming data writing onto a disk.

When the recording suspended state is set by the recording control means 18, power supply to the circuits shown enclosed by the broken line in FIG. 1 is halted by the operation suspension control means 21, so that data modulation by the encoder 12, data writing onto a disk, data reading from the disk, and reproduction of read data from the disk, are suspended.

As a result, power consumption by these circuits can be reduced while a recording suspended state is set.

When an amount of data equivalent to the data writing capacity has been stored in the buffer RAM 13 at S2, the recording control means 18 releases the recording suspended state to set a recording state.

In a recording state, the operation suspension control means 21 resumes power supply to the circuits shown enclosed by the broken line in FIG. 1, so that data modulation by the encoder 12, data writing onto a disk, data reading from the disk, and reproduction of read data from the disk, are resumed.

As a result, data in the buffer RAM 13 is modulated in the encoder 12 into recording data, which is then recorded via the optical head 1 onto the disk (S4).

Here, data recording onto the disk is resumed beginning with a region on the disk, which is successive, without a break, to a region where recording data was last recorded immediately before the discontinuation of data recording, wherein the data to be recorded onto the disk is the data in a frame successive to the data frame last recorded on the disk immediately before the discontinuation.

It should be noted that the disk remains rotating even in the recording suspended state.

Specifically, the motor servo circuit 9 controls the disk motor 8 so as to maintain the rotation speed immediately before entering the recording suspended state.

Therefore, a period of time after switching to a recording state till recovery by the disk to a rotation speed suitable for data recording onto the disk, can be reduced.

Also, the head servo motor 3 stores a DC voltage level of a focus control signal at the time immediately before switching to an operation suspended state, and outputs the stored DC voltage level as a focus control output when the operation suspended state is lifted.

With the above, after switching to a recording state, the optical beam from the optical head 1 comes into focus in an average state at the time when focus control was applied immediately before switching to an operation suspended state. This enables instant switching to a focus servo state.

Also, a period of time after releasing of a recording suspended state to beginning of disk reading for detection of a recording start position on the disk, can be reduced. Accordingly, a period of time before resuming of disk recording can thus be reduced.

Also, as a period of time till resuming of disk recording can be reduced, a period of time in a recording suspended state can be prolonged.

That is, the condition for releasing a recording suspended state is that an amount of data equivalent to data writing capacity has been stored in the buffer RAM 13. Therefore, when a period of time from releasing of a recording suspended state to resuming of disk recording can be reduced, timing for releasing a recording suspended state can be delayed. This enables storage of as much data as possible, within a range preventing overflowing of the buffer RAM 13, in the buffer RAM 13 so that the memory capacity of the buffer RAM 13 can be efficiently used.

Then, data is written onto a disk until no data is left in the buffer RAM 13 (S5, S1). With no data left in the buffer RAM 13, the operation process returns to S3 to halt data writing onto the disk.

It should be noted that operation of the respective circuits shown enclosed by the broken line in FIG. 1 may be suspended by halting supply of an operation clock, differing from the above wherein power supply to these circuits is halted by the operation suspension control means 21, to thereby achieve reduction of power consumption.

Also note that, although a recording method is not mentioned in the above embodiment, power consumption can be reduced corresponding to various recording methods, such as a disk-at-once method, a track-at-once method, a session-at-once method, or other packet-write methods.

Furthermore, the system control circuit may be constructed as a micro-computer, and in this case each means of the system control circuit is accomplished by executing a corresponding program. On the other hand, one or more means in the system control circuit can be structured as a hardware circuit.

What is claimed is:

1. A recording data processing circuit for processing received data sent at a slower data transmission speed than a data processing speed at which to write recording data onto a non-erasable, write-once disk, comprising:
a buffer memory for temporarily storing the received data;
a data processing circuit for preparing the recording data to record onto the disk, based on the received data read from the buffer memory;
a system control circuit for controlling writing and reading of the received data with respect to the buffer memory, and operation of the data processing circuit, and
a writing circuit for writing the recorded data supplied from the data processing circuit, onto the disk,
wherein
the system control circuit suspends operation of the data processing circuit until an amount of received data equivalent to a predetermined writing capacity has been stored in the buffer memory, and releases suspension of the operation of the data processing circuit when an amount of received data equivalent to the predetermined writing capacity has been stored in the buffer memory, said data processing circuit for recording data being placed in a suspended state by interrupting the power supply or by halting the supply of an operation clock,
wherein
the system control circuit stores an address successive to an address of received data last recorded onto the disk, as a recording start address on the disk, and controls the writing circuit so as to write the recording data supplied from the data processing circuit onto the disk at the recording start address,
and wherein
the system control circuit synchronizes the recording data to be newly recorded onto the disk, supplied from the data processing circuit to the writing circuit, with recording data recorded on the disk, said data processing circuit being operated in synchronism with a reproduction clock obtained by reproducing the data already recorded on the disk.

2. A recording data processing device according to claim 1, further comprising a motor control circuit for controlling a motor for driving the disk, wherein the motor control circuit controls the motor such that the disk rotates, while operation of the data processing circuit is suspended, at a same speed as that at which the disk rotated immediately before the suspension of data recording.

3. A recording data processing device according to claim 1, wherein the writing capacity of the buffer memory is set at full memory capacity of the buffer memory.

4. A recording data processing device according to claim 1, wherein the writing capacity of the buffer memory is set at full memory capacity of the buffer memory deducted by an amount of data expected to be written into the buffer memory before data recording onto the disk is resumed.

5. A recording data processing circuit for processing received data sent at a slower data transmission speed than a data processing speed at which to write recording data onto a disk, and recording the recording data onto the disk, comprising;
- a buffer memory for temporarily storing the received data;
- a data processing circuit for preparing the recording data to record onto the disk, based on the received data read from the buffer memory;
- a system control circuit for controlling writing and reading of the received data with respect to the buffer memory, and operation of the data processing circuit, and
- a writing circuit for writing the recording data supplied from the data processing circuit onto the disk, wherein the system control circuit suspends operation of the data processing circuit and writing of the recording data onto the disk by the writing circuit until an amount of received data equivalent to a predetermined writing capacity has been stored in the buffer memory, and releases suspension of the operation of the data processing circuit to resume writing of the recording data onto the disk by the writing circuit when an amount of received data equivalent to the predetermined writing capacity has been stored in the buffer memory, said data processing circuit being placed in a suspended state by interrupting the power supply or by halting the supply of an operation clock;

wherein the system control circuit stores an address successive to an address of received data last recorded onto the disk, as a recording start address on the disk, and controls the writing circuit so as to write the recording data supplied from the data processing circuit onto the disk at the recording start address, and wherein the system control circuit synchronizes the recording data to be newly recorded onto the disk, supplied from the data processing circuit to the writing circuit, with recording data recorded on the disk, said data processing circuit being operated in synchronism with a reproduction clock obtained by reproducing the data already recorded on the disk.

6. A recording data processing device according to claim 5, further comprising a motor control circuit for controlling a motor for driving the disk, wherein the motor control circuit controls the motor such that the disk rotates, while operation of the data processing circuit is suspended, at a same speed as that at which the disk rotated immediately before the suspension of data recording.

7. A recording data processing device according to claim 5, wherein the writing capacity of the buffer memory is set at full memory capacity of the buffer memory.

8. A recording data processing device according to claim 5, wherein the writing capacity of the buffer memory is set at full memory capacity of the buffer memory deducted by an amount of data expected to be written into the buffer memory before data recording onto the disk is resumed.

* * * * *